United States Patent
Sakakibara (10) Patent No.: US 7,422,352 B2
(45) Date of Patent: Sep. 9, 2008

(54) VEHICLE CONSOLE DEVICE

(75) Inventor: Yoshihiro Sakakibara, Iwakura (JP)

(73) Assignee: Kabushiki Kaisha Imasen Denki Seisakusho, Inuyama (JP)

( * ) Notice: Subject to any disclaimer, the term of this patent is extended or adjusted under 35 U.S.C. 154(b) by 0 days.

(21) Appl. No.: 11/737,738

(22) Filed: Apr. 19, 2007

(65) Prior Publication Data

US 2007/0189027 A1 Aug. 16, 2007

(30) Foreign Application Priority Data

Oct. 25, 2004 (JP) ............................... 2004-310076
Jul. 14, 2005 (JP) ........................ PCT/JP05/12992

(51) Int. Cl.
*B60Q 3/02* (2006.01)

(52) U.S. Cl. ...................... 362/490; 362/488; 362/154

(58) Field of Classification Search .................. 362/85, 362/132, 154, 362, 487, 488, 490, 492, 493, 362/503, 546; 296/37.1, 37.7
See application file for complete search history.

(56) References Cited

U.S. PATENT DOCUMENTS 3,619,592 A * 11/1971 Lamb, Jr. ..................... 362/91
4,628,417 A * 12/1986 Kaminski et al. ........... 362/490
5,174,644 A * 12/1992 Hermansson et al. ....... 362/492
6,315,436 B1* 11/2001 Schenk et al. ............... 362/488
2007/0133217 A1* 6/2007 Tiesler ....................... 362/490

FOREIGN PATENT DOCUMENTS

| JP | S58-68344 U | 5/1983 |
| JP | H02-118368 U | 9/1990 |
| JP | H10-076881 A | 3/1998 |
| JP | 2001-151012 A | 6/2001 |
| JP | 2002-293193 A | 10/2002 |

\* cited by examiner

*Primary Examiner*—Y My Quach Lee
(74) *Attorney, Agent, or Firm*—Hiroe & Associates; Michael L. Crapenhoft (57) ABSTRACT

A console device for a vehicle includes a housing body fixed by a side face to the ceiling part of the vehicle. The device has a recessed part formed by an opening in another side face, and a cover body that pivots on the housing body. The recessed part can be closed by moving the cover body into place over the recessed part of the housing body. A storage portion formed on the surface of the cover body opposite the recessed part allows small articles to be stored inside it and removed from it only when the recessed part is opened. An illumination portion that radiates light to the inside of the vehicle cabin is formed on another surface of the cover body.

3 Claims, 7 Drawing Sheets

Prior Art

Fig. 10

Prior Art

VEHICLE CONSOLE DEVICE

BACKGROUND OF THE INVENTION

The present invention relates to an overhead console device attached to a ceiling portion of a vehicle, in particular to an overhead console device integrally formed with a storage section capable of storing small articles and an interior lamp.

Conventionally, overhead console devices of various configurations have been put into practical use. In particular, the applicant of this application has been proposed an overhead console device configured to have a storage section and an interior lamp as disclosed in Japanese Laid Open Patent Application No. 10-76881.

Figure 9:
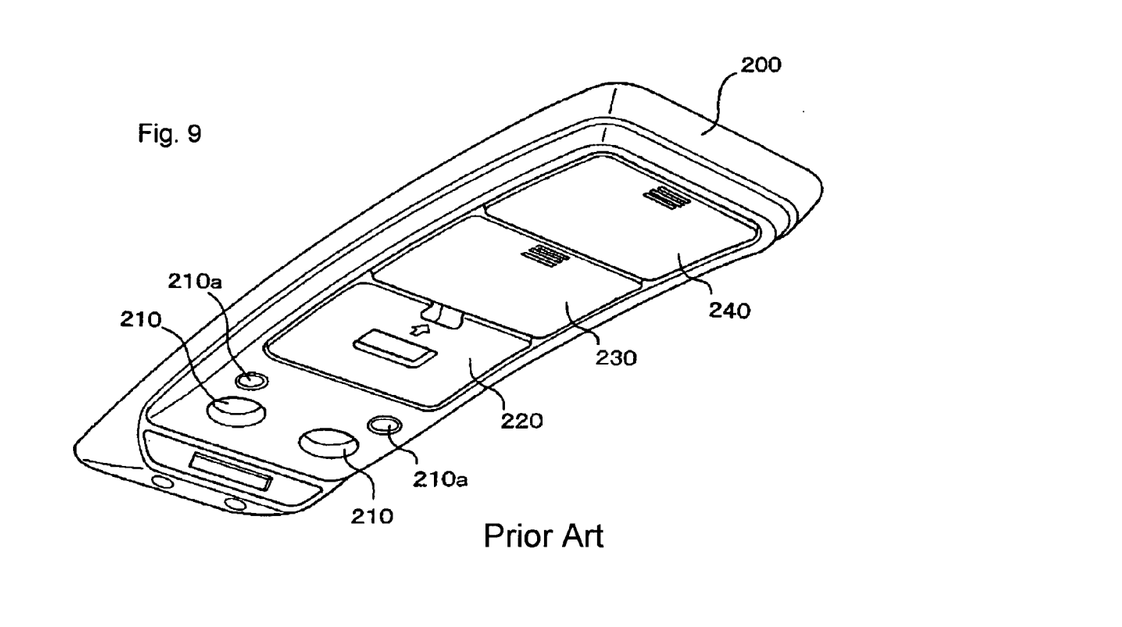
FIG. 9 is a perspective view showing a conventional vehicle console device.
Figure 10:
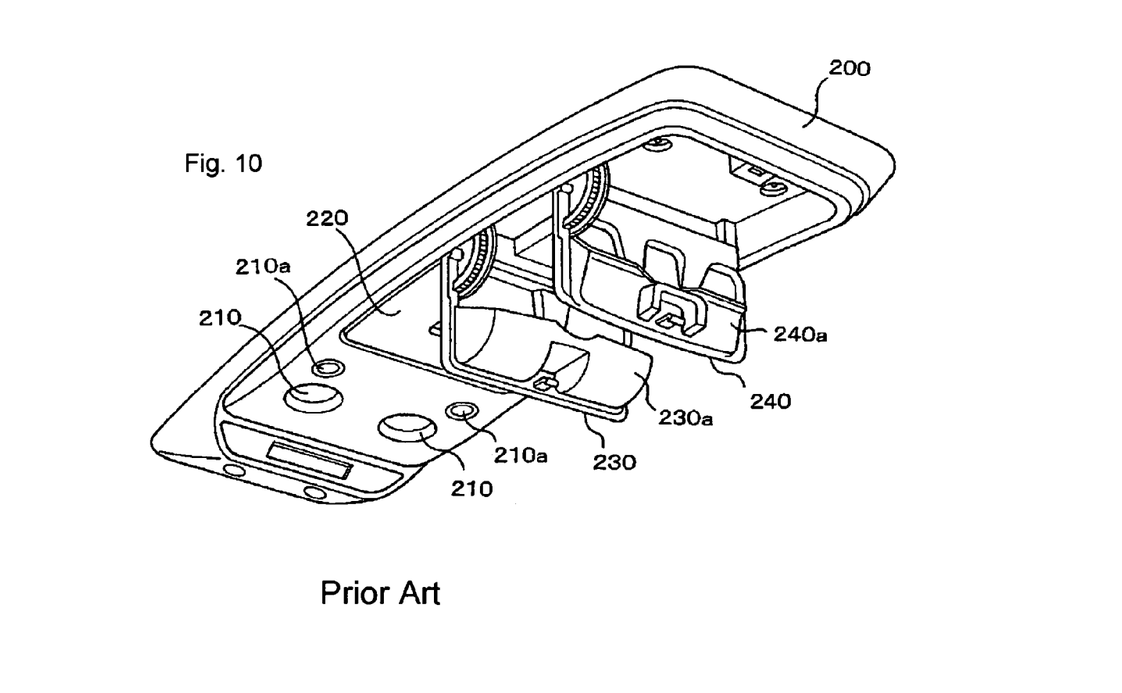
FIG. 10 is a perspective view showing the conventional vehicle console device, covers of which are opened.

The overhead console device disclosed in Japanese Laid Open Patent Application No. 10-76881 has a housing 200, which is attached to a ceiling portion of a vehicle as shown in FIG. 9 or FIG. 10. Disposed in a front area of the housing 200 are map lamps 210 for illumination and switches 210a for controlling the operation of the map lamps 210. Three storage sections 220, 230 and 240 are disposed in line in an area behind the map lamps 210. The storage section 220 is arranged to receive a wireless transmitter; the storage section 230 is provided with a sunglasses holder 230a; and the storage section 240 is provided with a cardholder 240a.

In the conventional overhead console device disclosed in Japanese Laid Open Patent Application No. 10-76881, the interior lamps and the storage sections for storing small articles are disposed within one housing member. Therefore, the overhead console device can be easily attached to a vehicle and provides satisfactory user friendliness. However, the conventional overhead console device has a disadvantage in that the device itself tends to be larger in size. This makes the overhead console device of this type difficult to mount on a small size vehicle in which mounting space on its ceiling is limited or a vehicle equipped with a sunroof device in which the mounting space is further limited.

The present invention has been proposed in view of the above problems. The inventor has found that the above problems can be solved by arranging the storage section and the interior lamp in a manner of, so-called, "two sides of the same coin". The problems to be solved by the present invention as described below.

SUMMARY OF THE INVENTION

It is an object of the present invention to provide a vehicle console device, which is attached onto the ceiling of a vehicle, in which a lighting device illuminating a vehicle compartment and a storage for storing small articles are integrally arranged thereby saving space in the vehicle ceiling and permitting the space in the ceiling to be used more effectively.

To solve the above-mentioned problems, the means adopted by the present invention is as described below. A first aspect of the invention has a technical characteristic in that a vehicle console device comprises: a housing member one side of which is attached and fixed to a ceiling of a vehicle and the other side of which is opened to form a concave portion; and a cover member supported on a shaft in a rotatable manner with respect to the housing member, the concave portion of the housing member receiving the cover member therein thereby closing the concave portion, wherein on a face of the cover member facing to the concave portion, a storage section is formed for allowing small articles to be put therein and taken out therefrom only when the concave portion is opened, and on the other face of the cover member, an illuminating section is formed for radiating light into a vehicle compartment.

A second aspect of the present invention has a technical characteristic in that, in the vehicle console device of the first aspect, the illuminating section is composed of a light source provided at the housing member side, and a light reflector and a lens provided at the cover member side, wherein the light radiated from the light source is reflected by the light reflector toward the lens to illuminate the interior of the vehicle compartment through the lens.

A third aspect of the present invention has a technical characteristic in that, in the vehicle console device of the second aspect, the housing member is formed with a light-radiating window for radiating the light from the light source, and the cover member is formed with a light-passing window for allowing the light from the light source to pass therethrough when the cover member is received in the concave portion, wherein the light from the light source radiates the light reflector through the light-radiating window and the light-passing window when the cover member is released from the concave portion, and wherein the light from the light source illuminates inside the storage section through the light-radiating window.

A fourth aspect of the present invention has a technical characteristic in that, in the vehicle console device of the third aspect, the light source is disposed in the housing member so as to radiate the light in the forward direction of the vehicle mounted with the vehicle console device.

A fifth aspect of the present invention has a technical characteristic in that, in the vehicle console device of any one of aspects 2-4, the light source employs LEDs, and a plurality of the LEDs is disposed in line at the attached position.

According to the vehicle console device of the first aspect, the storage section allowing small articles to be put therein and taken out therefrom and the illuminating section for radiating the light into the interior of the vehicle compartment are arranged in a manner of, so-called, "two sides of the same coin" with respect to the cover member, which is rotatably supported with respect to the housing member. Therefore, the vehicle console device itself can be reduced in dimensions. Accordingly, such effect is obtained that the vehicle console device including the storage section and the illuminating section can be mounted on a small size vehicle or a vehicle equipped with sunroof device, which are limited in installation area.

According to the vehicle console device of the second aspect, the illuminating section has the light reflector and the lens disposed in the cover member but the light source is disposed elsewhere than the cover member. Therefore, in addition to the effect of the first aspect, such effect is obtained that wires do not have to be laid through a moving part such as a hinge for the cover member, and thus the wiring can be made easily. Also, since the light source is eliminated from the cover member, the illuminating section can be made thinner equivalent to the thickness of the light source. As a result, such effect can be obtained that little storing space is reduced in the storage section, which is disposed in the rear face of the illuminating section thereby ensuring the capacity of the storage section.

According to the vehicle console device of the third aspect, in addition to the effects of the first and second aspects, the following effect is obtained. That is, in this aspect, when the cover member is positioned being received in the concave portion, the light from the light source proceeds through the light-radiating window and the light-passing section and is reflected by the light reflector, and illuminates the interior of the vehicle compartment through the lens. On the other hand, when the cover member is at a position opened from the concave portion, the light from the light source illuminates the storage section of the cover member through the light-radiating window. Therefore, small articles can be put therein and taken out therefrom even at night or in a dark place like an indoor parking area. That is, one light source can be utilized in two ways, and the number of parts can thus be reduced.

According to the vehicle console device of the fourth aspect, in addition to the effects of the first and second aspects, the following effect is obtained. In this aspect, since the light source is disposed in such a way that the light is radiated in the forward direction of the vehicle, passengers sitting in the driver's seat is prevented from being irradiated directly by the light emitted from the light source. That is, even when the light from the light source illuminates the storage section in a state that the cover member is opened from the concave portion of the housing member, the light is not radiated directly to the passenger. An effect is obtained such that the passenger can be prevented from being "dazzled" due to the light emitted from the light source.

According to the vehicle console device of the fifth aspect, in addition to the effects of the first to fourth aspects, the following effect is obtained such that, by using the LED for the light source, the light source can be reduced in size and power consumption and the heat generated from the light source can be reduced to a relatively low level. Also, since the plurality of LEDs is disposed in line at the attached position, the light can be radiated substantially linearly to the light reflector, and a plane light can be radiated into the interior of the vehicle compartment from the light reflector.

BRIEF DESCRIPTION OF THE DRAWINGS

Particular embodiments of the invention are described below in conjunction with the appended drawings, in which.

DETAILED DESCRIPTION OF PARTICULAR EMBODIMENTS

A vehicle console device 1 according to an embodiment of the present invention will be described with reference to FIGS. 5 to 8.

Figure 5:
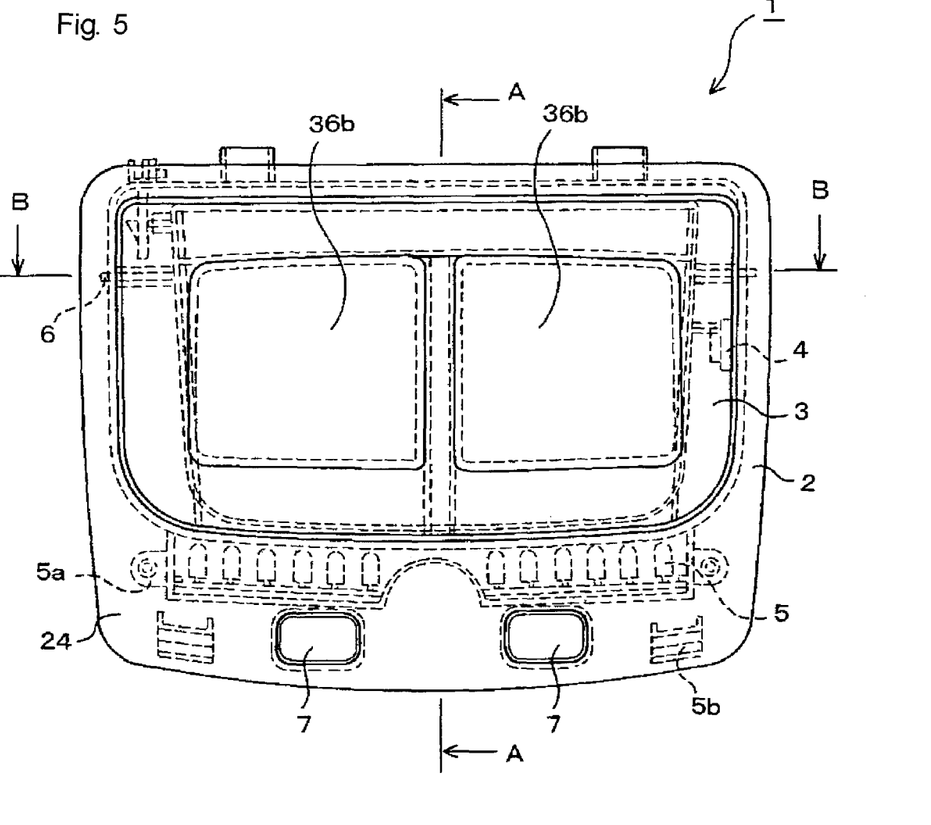
FIG. 5 is a front view showing the vehicle console device shown in FIG. 1.
Figure 6:
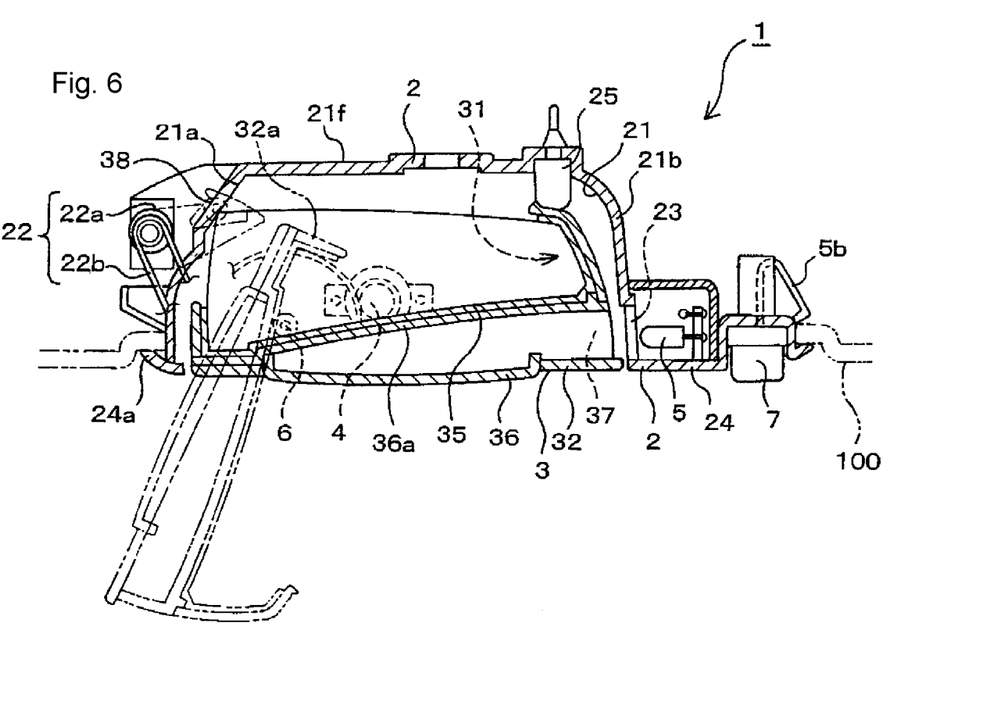
FIG. 6 is a cross-sectional view of the vehicle console device taken along line A-A in FIG. 5.
Figure 7:
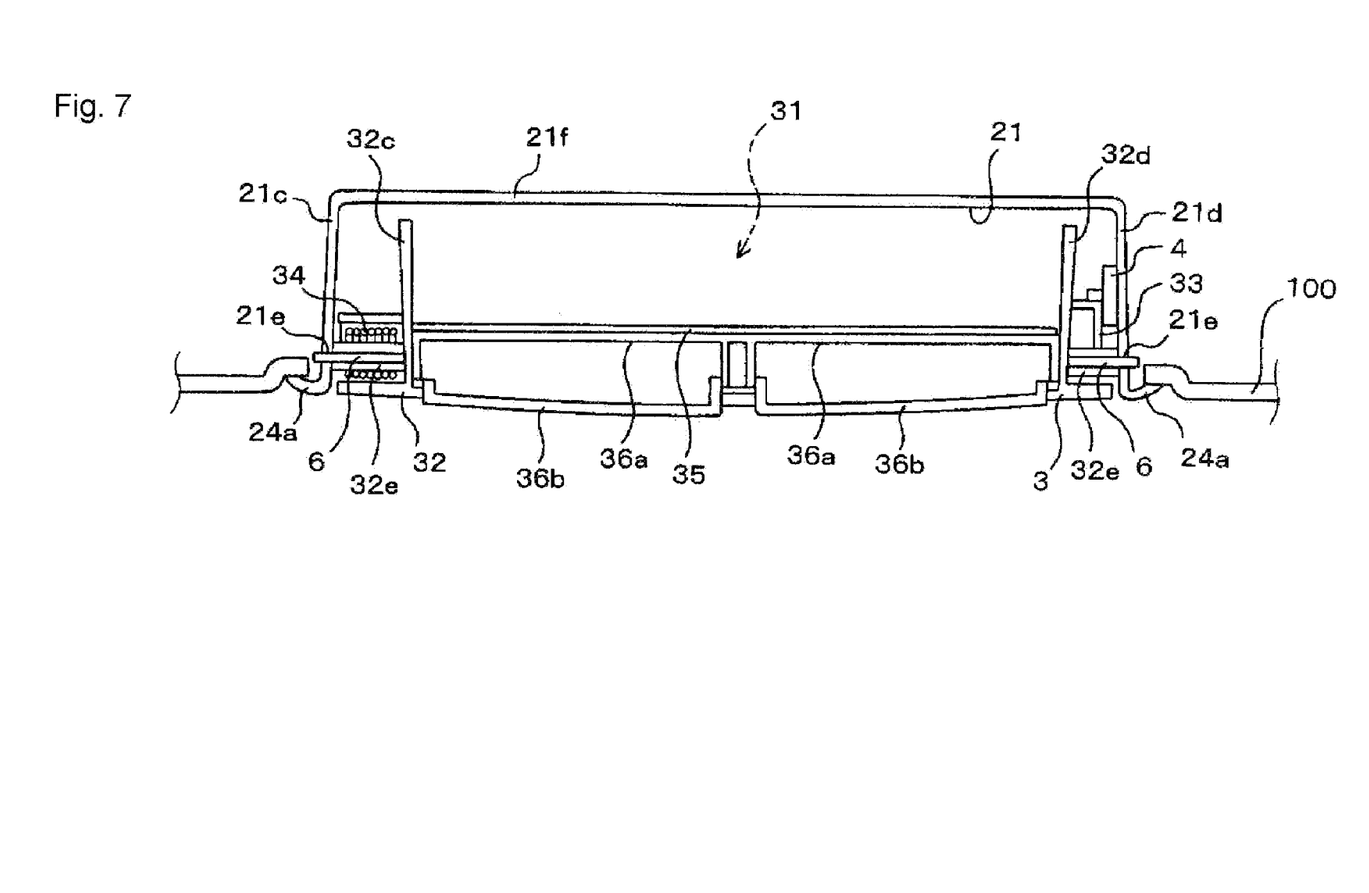
FIG. 7 is a cross-sectional view of the vehicle console device taken along line B-B in FIG. 5.
Figure 8:
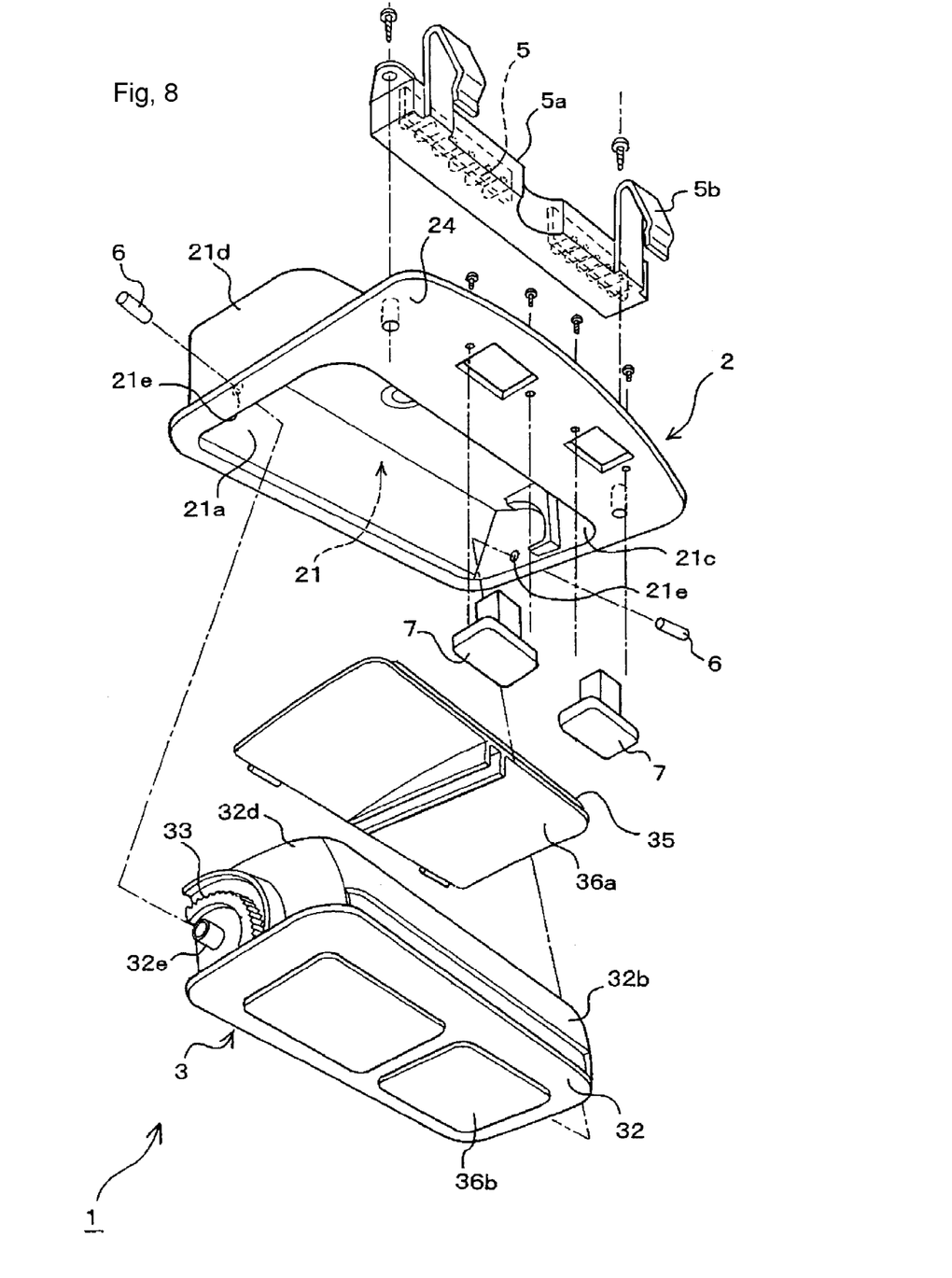
FIG. 8 is an exploded perspective view of the vehicle console device shown in FIG. 1.

FIG. 5 is a front view of the vehicle console device 1 according to the embodiment, FIG. 6 is a cross-sectional view of the vehicle console device 1 taken along a line A-A in FIG. 5, FIG. 7 is a cross-sectional view of the vehicle console device 1 taken along a line B-B in FIG. 5, and FIG. 8 is an exploded perspective view of the vehicle console device 1 of the present invention.

As shown in FIGS. 5 to 8, the vehicle console device 1 according to the embodiment comprises a housing member 2 and a cover member, and the cover member includes an illuminating section and a storage section 31.

The housing member 2 is attached to a ceiling 100 of a vehicle and fixed thereto at one side thereof, and has a box-shaped concave portion 21, which is formed in substantially U-like shape in cross section at the other side thereof. In this embodiment, the upper face side of the housing member 2 is arranged to be attached to the ceiling 100 of the vehicle and fixed thereto, and the lower face side of the housing member 2 is opened to have a concave portion 21.

The concave portion 21 receives a "cover member", which will be described later in detail. Since the cover member is formed with an illuminating section and a storage section, dimensions for receiving the illuminating section and the storage section has to be ensured. In this embodiment, the cover member has a box-like shape, formed in a substantially U-like shape in cross-section, the lower face of which is opened. The cover member is enclosed by a front side wall 21a located at the front side of the vehicle, a rear side wall 21b located at the rear side of the vehicle opposing to the front side wall 21a and a right side wall 21c and a left side wall 21d located abutting on the front side wall 21a and the rear side wall 21 opposing to each other, and the upper face thereof is closed by a upper wall 21f.

Further, at the lower end portion of the respective side walls 21a, 24b, 21c and 21d, frame portion 24 is formed horizontally extending outward therefrom. On the circumference of the frame portion 24, an engagement catch 24a is formed, which engages with the ceiling 100 when the housing member 2 is attached and fixed to the ceiling 100.

A portion formed at the rear side of the concave portion 21 of the frame portion 24 has a particularly large area, and on the face at the ceiling side thereof, "light sources" are disposed along a light-radiating window 23, which will be described later. When the light is ON, the light is radiated from the light-radiating window 23 toward the concave portion 21. On the other hand, on the face at the interior side, switches 7 are attached so that the light source can be switched between constant-"ON", "OFF" and "ON" at door-open.

The cover member has the storage section 31 and the illuminating section, and is rotatably supported with respect to the housing member. When the cover member is received in the concave portion, the concave portion can be closed. In this embodiment, the cover member is arranged as a lid 3 having the storage section 31 and the illuminating section, which are integrally formed on the front and rear faces thereof. The lid 3 is arranged in a way to be rotatably attached to the concave portion 21 from the bottom thereof and is received within the concave portion 21.

The storage section 31 is formed in the face of the cover member, which opposes to the concave portion 21 of the housing member 2, and is arranged in such a way that only when the cover member is opened from the concave portion, small articles can be put therein and take out therefrom. In this embodiment, in this storage section 31, defining the face opposing to the concave portion 21 in the lid 3 as bottom face 32, a front wall 32a, a right wall 32c and a left wall 32d are formed, which extend upward from the bottom face 32. And further, a rear wall 32b is formed in a sack-like shape by bending the rear end portion of the bottom face 32 upward and then forward. By enclosing with four walls, the storage section 31 is formed on the lid 3. Each of the right wall 32c and the left wall 32d is provided with a bearing 32e, 32e, when the pins 6 are inserted into the respective bearing holes 21e, 21e, which are formed in the right side wall 21c and the left side wall 21d so that the lid 3 is rotatably attached to the housing member 2. Owing to this arrangement, referring to FIG. 6, when the lid 3 is rotated to its opened-position, the inner face of the rear wall 32b faces upward and articles stored within the storage section 31 can be received in this part, thus the articles can be prevented from being dropped therefrom.

The illuminating section is disposed at the rear side of the storage section 31 of the cover member. When the cover member (lid 3) is received in the concave portion 21 of the housing member 2, the interior of the vehicle compartment is illuminated, and the illuminating section functions as, so-called, "room lamp" or "map lamp". The illuminating section includes the light source that emits light, a light reflector that reflects the light emitted from the light source to the interior and lenses 36b that condense the reflected light toward the interior. In the illuminating section of this embodiment, the light reflector (reflector 36a) and lens 36b are disposed in the lid 3 (cover member) but the light source is not disposed in the lid 3. By disposing the light source within the concave portion 21 of the housing member 2, the thickness of the illuminating section in the lid 3 is reduced. That is, by eliminating the light source from the cover member, the illuminating section can be arranged to be thinner equivalent to the thickness of the light source. Therefore, storing space in the storage section, which is disposed on the rear face of the illuminating section, can be prevented from being used for the light source thereby ensuring the capacity of the storage section. Also, since the wires do not have to be laid through a moving portion such as a hinge of the cover member, the wiring can be carried out easily resulting in an increase of assembly efficiency of the console device. Needless to say that the present invention is not particularly limited to the above-described structure, but the light source may be disposed in the lid 3.

In this embodiment, in the storage section 31 formed in the lid 3, a partitioning plate 35 is disposed therein as shown in FIG. 6, and the partitioning plate 35 partitions and divides a part of the storage section 31. The upper face of the partitioning plate is utilized as the bottom face of the storage section 31, and on the lower face of the partitioning plate, the reflector 36a is disposed as the light reflector that reflects the light from the light source toward the interior. Further, the lenses 36b that condense the reflected light from the light source toward the interior are integrally provided to the lower face 32 of the lid 3. The reflector 36a formed in an arc-like shape in cross-section, which curved facing to the lens 36b as shown in FIG. 6 or FIG. 8, and the surface facing to the lens 36b is deposited with aluminum to reflect the light from the light source to the lens 36b.

In the rear wall 32b of the lid 3, a light-passing window 37 is formed, and the light source is disposed within the light-radiating window 23. The light emitted from the light source passes through the light-radiating window 23 and is projected to the reflector 36a. The light-passing window 37 is disposed so as to face to the light-radiating window 23 at a position where the lid 3 is received in the concave portion 21. That is, when the lid 3 is positioned being received in the concave portion 21, the light emitted from the light source passes through the light-radiating window 23 and the light-passing window 37 and is projected to the reflector 36a. In place of the reflector 36a and the lens 36b, a "light guide plate" may be formed using a transparent resin in the lid 3 so as to guide the light emitted from the light source to the interior to illuminate the interior.

The light source employs a light emitting diode LED 5 (preferably, a high luminance LED or an ultra high luminance LED). A plurality of LEDs is disposed in line with respect to the reflector 36a so as to uniformly radiate the light thereto through the light-radiating window 23. A mounting bracket 5a is used to dispose the plural LEDs 5 in line as shown in FIG. 8.

The mounting bracket 5a has a substantially rectangular box-like shape and has an opening on one side in a longitudinal direction, and the plural LEDs 5 are disposed in line therein along the open face. The mounting bracket 5a is attached to the frame portion 24 of the housing member 2 at the ceiling side thereof with screws, and is arranged so that the open face is coincide with the light-radiating window 23 and thus the LEDs 5 are disposed within the light-radiating window 23 in line.

A pair of mounting fittings 5b is integrally formed on the face opposite to the open face of the mounting bracket 5a. As shown in FIG. 6, the mounting fittings 5b are arranged so that, when the mounting bracket 5a is attached to the housing member 2 and the housing member 2 is attached to the ceiling 100, the ceiling 100 is sandwiched between the mounting fittings 5b and the engagement catch 24a formed on the entire periphery of the housing member 2 thereby fixing the housing member 2.

In this embodiment, in view of advantage of power consumption and the like, the LED (high luminance LED) is employed as the light source. However, the present invention is not particularly limited to this constitution, but, in place of the LED, an incandescent lamp or a fluorescent lamp, which emits an appropriate light, may be used.

In this embodiment, the light source is controlled between constant-ON and OFF by operating the switches 7. In addition to this, a micro switch or the like may be disposed in the peripheral portion of the concave portion of the housing member 2 and may be arranged so that the light source is turned ON at the same time when the lid 3 is released from the concave portion 21.

Now, a method attaching the lid 3 to the housing member 2 will be described. As shown in FIG. 7 and FIG. 8, in the right side wall 21c and the left side wall 21d of the concave portion 21 of the housing member 2, a bearing hole 21e, 21e is formed respectively in which a pin 6, 6 is inserted to attach the lid 3 in a rotatable manner. A damper 4 is attached and fixed to the left side wall 21d to control the open/close speed of the lid 3. On the other hand, one of the bearings 32e, 32e at the right face 32c side in the lid 3, a spring 34 is provided on the periphery of the bearing so as to constantly energizing the lid 3 in the "open" direction. At the left wall 32d side, teeth 33 are formed in the circumference of the bearing and engaged with the damper 4. Thus, the force of the spring 34 is controlled by means of the resistance of the damper so as to allow the lid 3 to open at an appropriate speed. In the front side wall 21a of the housing member 2, a engagement device 22 including a heart cam 22a and a spring 22b is provided so that the lid 3 can be latched at the position being received within the concave portion 21 as shown in FIG. 6.

In the front-end portion of the right wall 32c of the concave portion 21, an engagement portion 38 is formed. The lid 3 is arranged as a push-open type lock mechanism in which, when the engagement portion 38 is engaged with the engagement device 22, the lid 3 can be held at a position where the lid 3 is received within the concave portion 21; and when the lower face 32 of the lid 3 is pushed, the engagement is released therefrom owing to the energizing force of the spring 34.

However, since the lid 3 is arranged as the push-open type lock mechanism, when vibrations are given thereto in the state that the lid 3 is received in the concave portion 21, the lid 3 vibrates in the vertical direction and may be opened. In order to prevent this problem, in the console device 1 according to the embodiment, the upper wall 21f of the concave portion 21 is provided with an elastic member 25 that gives an appropriate force downward to the lid 3 when the lid 3 is received in the concave portion 21 (in a state that the lid 3 is locked).

Figure 1:
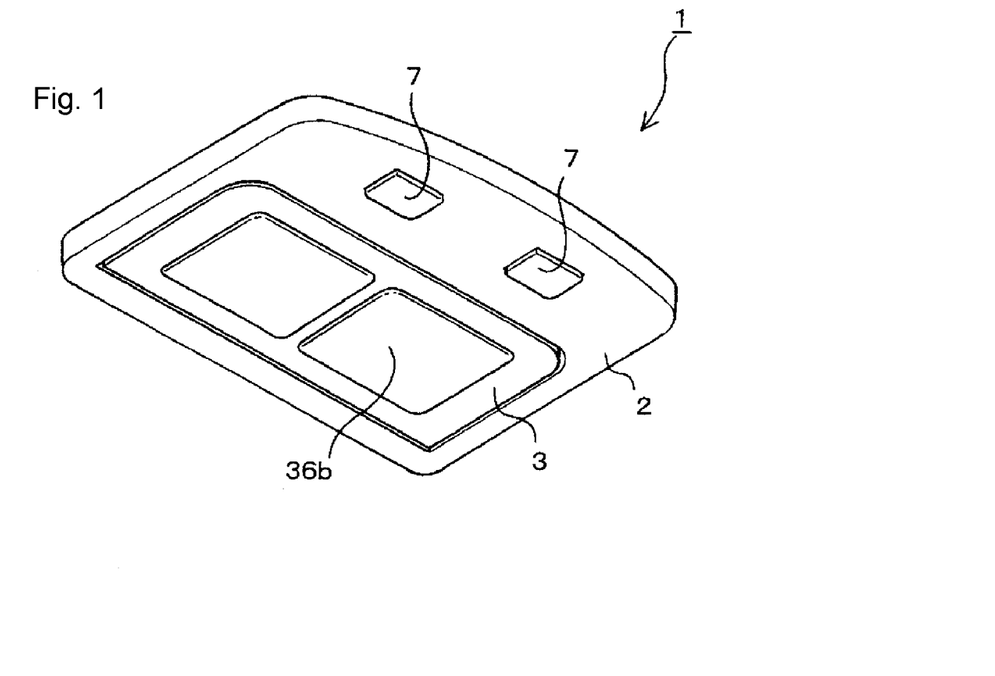
FIG. 1 is a view of a vehicle console device of the present invention, which is attached to a ceiling (not shown) of a vehicle as viewed from a lower position at an angle.
Figure 3:
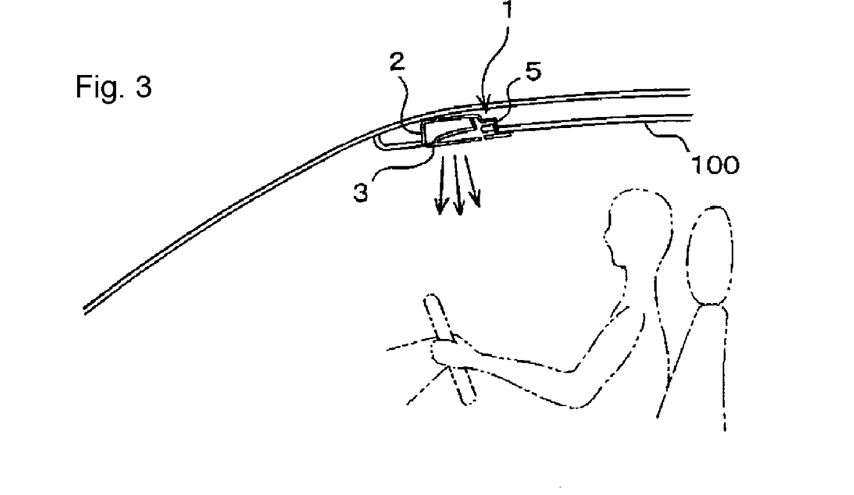
FIG. 3 is a view of the vehicle console device shown in FIG. 1, mounted on a vehicle, showing a state in use.

Now, the operation of the above-described vehicle console device 1 will be described. When the lid 3 is at a position being received in the concave portion 21 as shown in FIG. 1 or FIG. 3, and when the switch 7 is operated, the LED 5 emits light. The light is allowed to pass through the light-radiating window 23 and the light-passing window 37 opposed to each other, and is reflected by the reflector 36a and thus the light illuminates the interior of the vehicle compartment through the lenses 36b. In this embodiment, since a "map lamp" is assumed, when the light source emits the light, an area adjacent to the hands of a passenger is illuminated.

Figure 2:
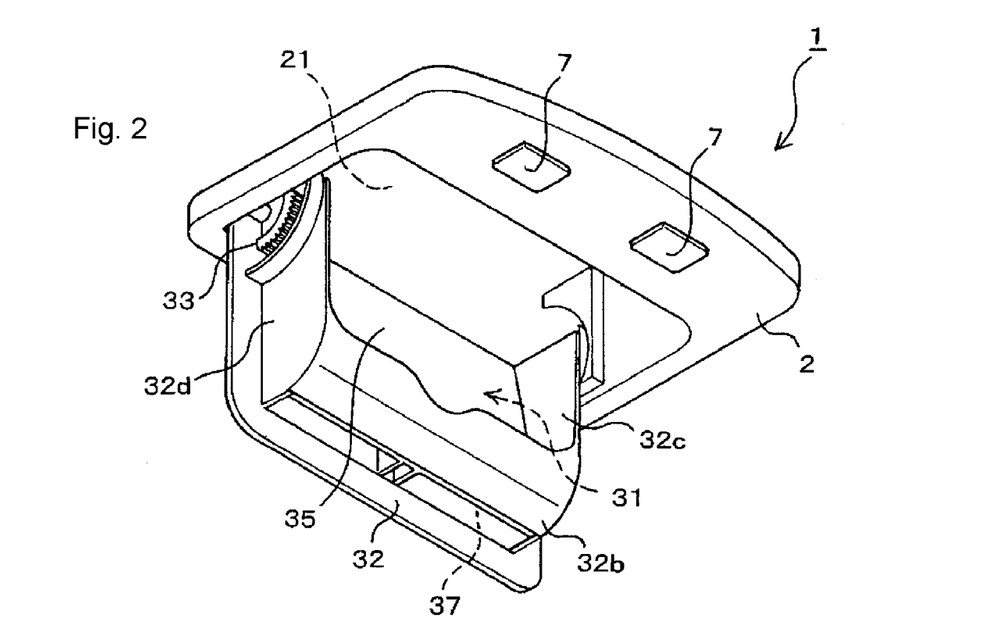
FIG. 2 is a view of the vehicle console device shown in FIG. 1 showing a state in which a cover member of a housing member is released from a concave portion as viewed from the lower position at an angle.
Figure 4:
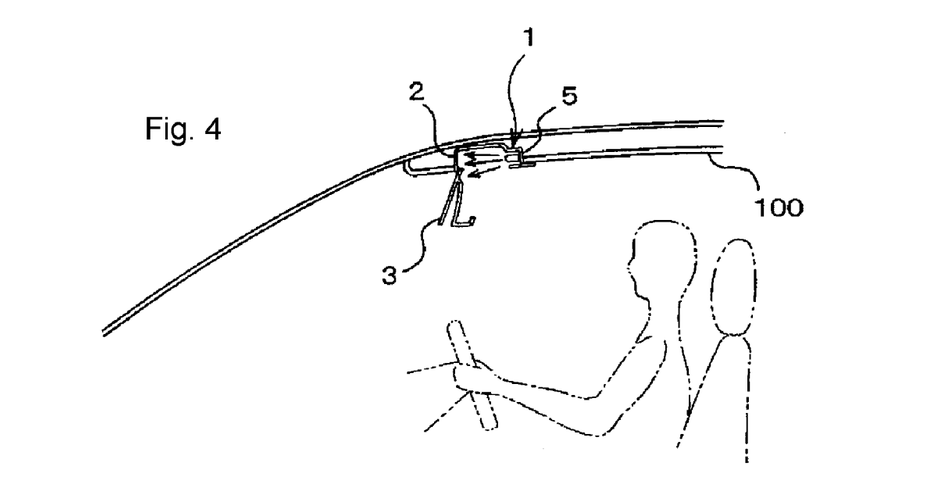
FIG. 4 is a view of the vehicle console device shown in FIG. 2, mounted on a vehicle, showing a state in use.

On the other hand, when the lower face 32 of the lid 3 is gently pushed, the push-open type lock mechanism is released. And when the lid 3 is at the position being released from the concave portion 21 as shown in FIG. 2 or FIG. 4, the storage section 31 of the lid 3 is opened to the interior of the vehicle compartment, and thus small articles can be put therein and taken out therefrom. At this time, when the switch 7 is operated to turn ON the LED 5, the light emitted from the LEDs 5 is radiated to the storage section 31 through the light-radiating window 23. Therefore, even at night or in a dark place like indoor parking, small articles can be easily put therein and taken out therefrom.

Here, in the embodiment shown in FIG. 4, the console device 1 is disposed in a slightly front of the passenger and the illuminating direction of the light source is oriented to the forward direction of the vehicle. By disposing the light source as described above, the light emitted therefrom is prevented from directly illuminating the passenger sitting on the driver's seat. By arranging as described above, even when the light source is turned ON and the light is emitted in a dark place, the passenger can be prevented from being dazzled. The disposing direction of the light source is not limited to the forward direction of the vehicle. For example, when the light source is disposed being oriented to a side of the vehicle, the passenger can be prevented from being dazzled. Further, even when a layout such that the passenger is positioned in the illuminating direction of the light source is employed, by shielding using a semi-transparent plate or the like between the light source and the passenger, a certain effect of anti-dazzling is obtained.

As described above, in the vehicle console device 1, the reflector 36a and the lens 36b are formed integrally with the lid 3, and the light from the LEDs 5 as the light source attached to the housing member 2 is reflected to the interior. Thus, an effect of integration of the lid and the interior lamp without loosing the conventional function is obtained and a further compact device can be provided.

What is claimed is:

1. A vehicle console device, comprising:
   a housing member one side of which is attached and fixed to a ceiling of a vehicle and the other side of which is opened to form a concave portion; and
   a cover member supported on a shaft in a rotatable manner with respect to the housing member,
   the concave portion of the housing member receiving the cover member therein thereby closing the concave portion,
   wherein on a face of the cover member facing to the concave portion, a storage section is formed for allowing small articles to be put therein and taken out therefrom only when the concave portion is opened, and on the other face of the cover member, an illuminating section is formed for radiating light into a vehicle compartment,
   the illuminating section is composed of a light source provided at the housing member side, and a light reflector and a lens provided at the cover member side,
   the light radiated from the light source is reflected by the light reflector toward the lens to illuminate the interior of the vehicle compartment through the lens.

2. The vehicle console device according to claim 1, wherein
   the housing member is formed with a light-radiating window for radiating the light from the light source, and the cover member is formed with a light-passing window for allowing the light from the light source to pass therethrough,
   when the cover member is received in the concave portion, the light from the light source radiates the light reflector through the light-radiating window and the light-passing window,
   when the cover member is released from the concave portion, the light from the light source illuminates inside the storage section through the light-radiating window.

3. The vehicle console device according to claim 2, wherein the light source is disposed in the housing member so as to radiate the light in the forward direction of the vehicle mounted with the vehicle console device.

* * * * *